July 21, 1953 L. LYNCH 2,646,515
DIRECT CURRENT AMPLIFIER
Filed April 20, 1950 2 Sheets-Sheet 1

INVENTOR.
LESLIE LYNCH
BY
ATTORNEYS

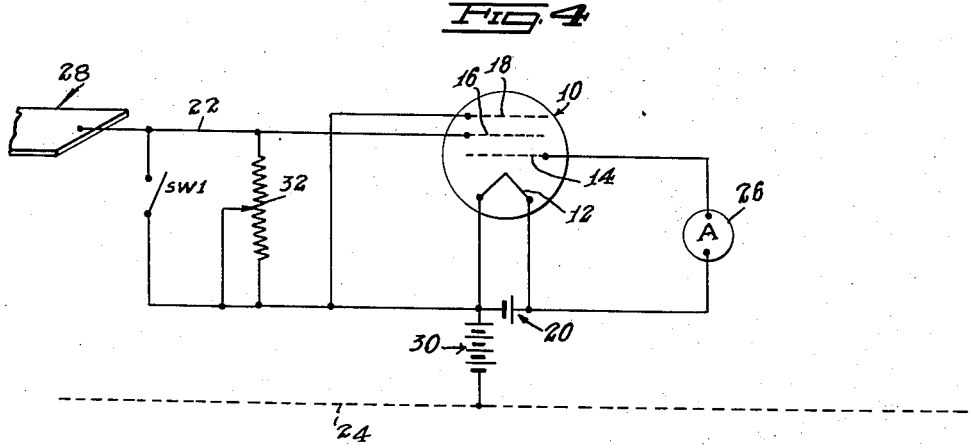
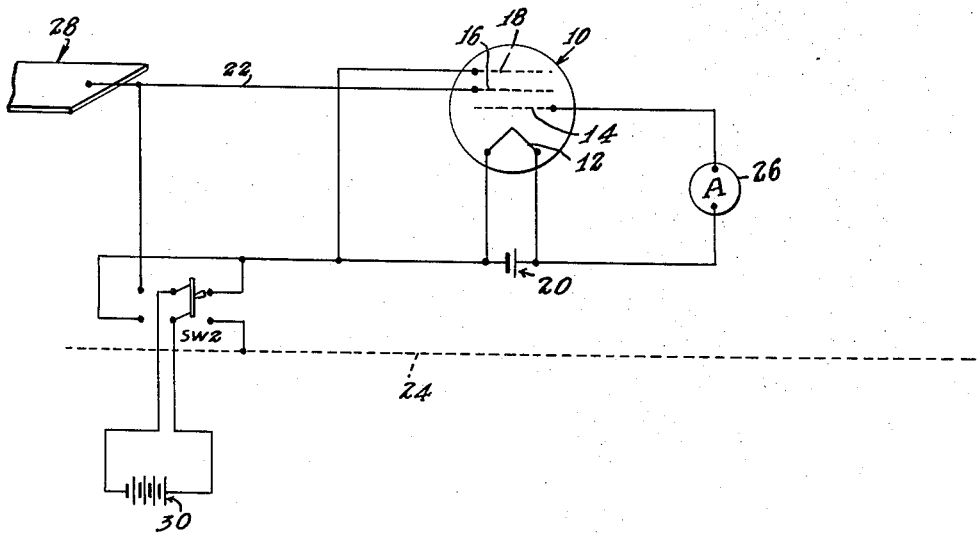

Patented July 21, 1953

2,646,515

UNITED STATES PATENT OFFICE 2,646,515

DIRECT CURRENT AMPLIFIER

Leslie Lynch, Bell, Calif., assignor, by direct and mesne assignments, of twenty-one per cent to Ralph E. Bletcher, three per cent to Pearl Bletcher, sixteen per cent to Hazel E. Skinner, twenty-two and one-half per cent to William G. Porter, and seven and one-half per cent to Irving A. Ward Application April 20, 1950, Serial No. 157,006

22 Claims. (Cl. 250—83.6)

1

This invention relates to direct current amplifier circuits and more particularly to a direct current amplifier circuit utilizing an exceedingly high input impedance and a very low output impedance which is particularly adaptable for use in a device for detecting radioactive substances and for measuring the intensity of radioactivity thereof.

In the past various types of radiation detectors to determine the presence of and to measure the intensity of alpha and beta particles, gamma, X and cosmic rays, ultra-violet light and various other forms of radioactivity have been proposed. Such devices, however, have been either expensive to manufacture and difficult to maintain or of exceedingly low sensitivity. Further, all but the most expensive of such devices cannot be employed to obtain qualitative and/or quantitative data with any degree of accuracy.

In accordance with the present invention, a novel circuit is provided which can be readily associated with a small ion chamber to provide a simple and inexpensive radiation detector which is easy to maintain yet which can be used for both qualitative and quantitative measurements of radioactivity with a high degree of accuracy and sensitivity.

Accordingly, it is one of the important objects of this invention to provide a direct current amplifier circuit of high sensitivity which requires but a very low power input.

It is a more specific object of this invention to provide such a circuit having a very high input impedance and a very low output impedance.

It is a further object of the present invention to utilize such a circuit in a device for detecting and measuring radioactivity.

It is another object of this invention to provide a device for detecting and measuring radioactivity which is inexpensive to manufacture and operate, is highly sensitive and which requires but a small, light-weight and inexpensive power supply.

It is still another object of this invention to provide such a device which will give accurately quantitative as well as qualitative measurements of radioactivity.

Other objects and advantages of the invention will be apparent during the course of the following description.

In the accompanying drawings forming a part of this specification and in which like numerals are employed to designate like parts throughout the same:

2

Figure 4 is a circuit diagram of a second modification of the circuit shown in Figure 2;

Figure 5 is a circuit diagram of a third modification of the circuit shown in Figure 2.

Figure 1:
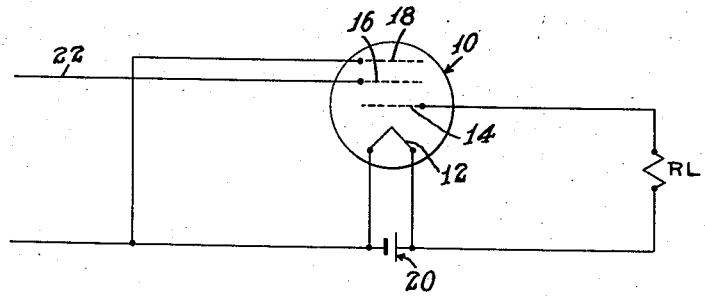
Figure 1 is a circuit diagram of the basic circuit embodied in the present invention.

Referring first to Figure 1, the basic circuit employed in the present invention will be described. The numeral 10 indicates a vacuum tube having a directly heated cathode 12, a first grid 14, a second grid 16 and a third grid 18. The grids 14, 16 and 18 are preferably of the common wire mesh type with the grid 16 being located in an electrically balanced position substantially midway between the grids 14 and 18. While such midway position of grid 16 is described herein, it should be understood that certain features of the present invention may be realized when the grid 16 is not in such midway position. For purposes of definition, the term "electrically balanced position of grid 16" means that the grid 16 is in a position where it has substantially the same potential as the space vacated by the same, assuming its removal. In other words, the position of the grid 16 is such in relationship to the spacing and potential on the grids 18 and 14 and cathode 12 that such grid does not appreciably unbalance the potential gradient created by the spacing and voltages on grids 14 and 18 and cathode 12. Stated in still other words, the grid 16 in such electrically balanced position has that potential which it would otherwise assume were such grid floating, i. e., not interconnected in the circuitry as illustrated in Figure 1. The tube is preferably of conventional construction with each of the grids being spirally wound to form a cylinder and supported on suitable vertical insulators. It has been found, for example, that a type 1T4 miniature tube in which the three grids and the cathode are used is entirely satisfactory. Wide variations, however, in the structure of the tube used are possible, as long as the grid 16 lies a substantially electrically balanced position between grids 14 and 18. A small battery 20 is used to heat the cathode 12. A load resistor RL, of very low impedance, is connected between the positive side of the cathode 20 and the first grid 14. The third grid 18 is connected directly to the negative side of the cathode 12, and an input lead 22 is connected directly to the second grid 16.

The first grid 14, being connected to the positive side of the battery 20 will, in general, be positively charged with respect to the cathode 12 with the result that the grid 14 will attract electrons emitted therefrom. This will cause a current to flow through the load RL as indicated by the arrow in Fig. 1. This current will be comparatively small. Thus, if a type 1T4 tube is used and the battery 20 is a conventional 1½ volt dry cell, the output current will vary between 0 and about 100 microamperes, or slightly more. As will be apparent to those skilled in the art, the first grid 14 which, in a conventional circuit employing a tube such as tube 10 would be used as the control grid, is functioning as an anode. In the circuit shown, the second grid 16 is employed as a control grid. It has been found that the output current through the load RL will vary quite linearly in the range of 40 to 100 microamperes as the voltage on this second grid 16 is changed. Thus if a relatively high negative voltage is applied to grid 16, such voltage will set up a negative charge on this grid which in turn will create a negative electrostatic field in the area surrounding the grid. This negative field will act to repel electrons leaving the cathode 12. The repulsion of such electrons reduces the number of electrons passing from the cathode 12 to the first grid 14 and hence reduces the current passing through the load RL. If the voltage on grid 16 is made sufficiently negative, the tube will cut off entirely but as the negative voltage on grid 16 is decreased, that is, as the voltage on grid 16 becomes less negative, the current through the load RL will gradually increase and reach a maximum or saturated condition when the voltage on grid 16 becomes approximately equal to zero. In this manner, the second grid 16 which, in a tube of the type shown, would normally be used as a screen grid, is employed as a control grid to vary the output of the circuit.

As seen, the third grid 18 is connected directly to the negative side of the battery 20 and is therefore at a negative potential with respect to the first grid 14. The structure of the grid 18 is very similar to that of the grid 14 but need not be so and may be in the form of a conventional anode or plate and it is located at a distance from the grid 16 substantially equal to the spacing between the grids 14 and 16. The electrostatic field set up by the negative charge on the grid 18 effectively neutralizes the field set up by the positive charge on the grid 14 with the result that the grid 16, being located substantially midway between the two, is in an electrically balanced field or position and is therefore unaffected by the charges on the grids 14 and 18 when of course the voltage on grid 16 is at the median value of the voltages of grids 14 and 16. While the circuit will operate in the manner above described without the presence of the negatively charged grid 18, it has been found that the presence of such grid, particularly when the negative voltage on grid 6 is in the order of the average energy of the electrons reaching grid 14 greatly improves the operation of the circuit by insuring a linear response at relatively large output currents. Thus, to approach the maximum output current of the circuit, it is necessary to reduce the negative voltage on the grid 16 to a very low value. As this voltage approaches that of the battery 20 and the electrostatic fields set up by the charge on the grid 14 and the charge on the grid 16 approach each other in intensity, it has been found that the current through the load RL does not accurately respond to changes in the voltage applied to the grid 16 and that the output current will no longer linearly vary with the applied voltage. This difficulty is overcome by the negatively charged grid 18. Due to the opposing field set up in the vicinity of the grid 16 by the charge on the grid 18, the field set up by the positive charge on the grid 14 is balanced with the result that the controlling field set up by the charge on the grid 16 is unaffected thereby. However, when grid 16 is appreciably negative with respect to grid 14, grid 18 has a relatively small effect on the flow of space current through the load resistance.

In the circuit shown in Figure 1, it is essential that there be a very high input impedance, that is, between the input lead 22 and the cathode 12 in order that the low current drain characteristics of the circuit be preserved. In practical embodiments of the circuit shown in Figure 1, this is accomplished by means of careful insulation between these respective parts. With such a high input impedance, the output current will respond accurately to very small changes in the applied voltage. Thus, the circuit in Fig. 1 is a highly sensitive circuit having a high input impedance and a low output impedance. The power requirements of the circuit are exceedingly low and the output current which varies between about 0–100 microamperes, varies quite linearly in the range between 40–100 microamperes with changes in the voltage applied to the input or control grid.

Figure 2:
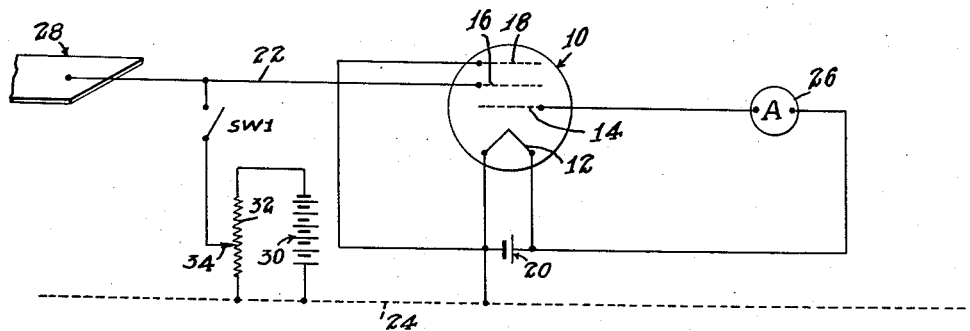
Figure 2 is a circuit diagram of a radiation detector embodying the present invention.

In Figure 2 there is illustrated a practical adaptation of the circuit of Figure 1. The entire circuit is enclosed in a case, indicated by the numeral 24, which acts as an ion chamber and is preferably desiccated. The load resistor RL of Figure 1 is replaced with a suitable microammeter 26, preferably having a range of 0–100 microamperes. A common, inexpensive 1.5 volt flashlight dry cell is utilized for the battery 20. The input lead 22 is connected directly to a collector plate 28 which is disposed in the case 24 at substantially the center thereof. A battery 30 is connected, at its positive terminal to the case 24. Bridging this battery is a variable potentiometer or voltage divider 32 having a sliding contact 34 which is connected to one terminal of a switch indicated as SW1. As seen, when the switch SW1 is closed, a negative potential will be applied to the collector plate 28 and hence to the grid 16. The amount of this negative potential will be determined by the voltage of the battery 30 and the position of the sliding contact 34 on the potentiometer 32. In a manner which will hereinafter be explained, the variable potentiometer 32 can be used to select the desired reference point for the instrument. When the sliding contact 34 is in its uppermost position, the full negative voltage of the battery 30 will be applied to the collector plate 28. In order to completely cut off the tube 10, that is, to reduce the output current to zero, it has been found that this voltage should be in the neighborhood of 30 volts, although this value will vary depending upon the structure of the tube 10, the resistance of the microammeter 26, the condition of the battery 20, etc. As will hereinafter be described, the switch SW1 is normally open, being closed only momentarily to impart the desired negative voltage to the collector plate 28. The current drain on this battery is negligible with the result that a very small inexpensive battery, many types of which are commercially available, may be employed.

The case 24 is preferably either metal or of

Bakelite or a similar material which is coated with metal on its inside for proper shielding. One wall of the case is perforated so as to admit radiation particles. This perforated wall is, however, covered with a thin foil which will not prevent the entrance of various radiation particles but will prevent the entrance of moist air to the interior of the case. Thus while one wall of the case is perforated, the case is air-tight due to the presence of the foil. This foil may be of very thin aluminum or like material. The collector plate 28 may be insulated, as by a rubber or polystyrene coating and made of zinc or other suitable metal. The area of the collector plate is determined by the volume of the particular case or ion chamber used. It has been found that such area is not critical so long as it is not so large in relation to the ion chamber that its rate of discharge becomes too slow nor so small that its ion collecting properties are too far reduced.

An operation of the device shown in Fig. 2 is as follows:

The entrance into the case 24 of radiation particles will result in the ionization of the gas in such chamber. The positive ions resulting from such ionization will be attracted to the collector plate 28 due to the negative charge on such plate. The collection of positively charged ions, due to such attraction, will decrease the negative charge on the plate. Since the collector plate 28 is directly connected to the grid 16 of the tube 10, as the potential on the plate 28 becomes more positive, the negative charge set up by the grid 16 will be reduced. The reduction of such charge will result in an increased current flow from the cathode 12, as heretofore explained with reference to Fig. 1, and more current will flow to the grid 14 and through the microammeter 26. The greater the concentration of positively charged ions in the chamber, the greater will be the current flow through the microammeter 26. Thus a device is provided which will qualitatively and quantitatively measure the intensity of radioactivity of a source to which it is exposed. As will be apparent to those skilled in the field of radioactivity, various types of shields can be utilized to isolate and measure the different types of radioactivity. Further, in the event it is desired to measure alpha particle radiation, the collector plate must be exposed directly to the source. The number of ions present in the chamber will depend upon the concentration of radiation particles present and hence upon the intensity of radioactivity of the source to which the device is exposed.

In addition to the presence of various radiation particles, the negative charge on the collector plate 28 will be reduced due to two other factors. Cosmic radiation will result in ionization in the chamber of the case 24 and will cause a gradual reduction in the negative voltage on the plate 28 with a corresponding gradual increase in the current through the microammeter 26. Further, while the plate 28 is very highly insulated from the cathode 12 of the tube 10, inasmuch as the impedance between these elements cannot practicably be made infinite, the charge on the plate 28 will slowly leak off. This too will result in a slow, gradual increase in the current through the microammeter 26. Thus due to the presence of cosmic rays and some finite impedance between the grid 16 and the cathode 12 of the tube, the output current of the tube will gradually increase with time. This unavoidable phenomenon will be referred to hereinafter as "back count." When the instrument is placed in a radioactive field, the rate of current increase will be increased by an amount determined by the intensity of the field. By comparing the readings on the meter 26 after a predetermined period of time against a known standard the existence and intensity of a radiation field can readily be determined. The device may be calibrated in the absence of any radiation whatever, that is, the back count or amount of current flow through the meter after a predetermined period of time in the absence of any field of radioactivity can be determined and then compared to the reading obtained after the same period of time when the instrument is exposed to a known or suspected source of radiation. The instrument may also be calibrated against some known radiation source. In this case, the meter reading is compared, after the instrument has been exposed to the known or standard radiation source for a certain time, to the meter reading obtained after the instrument has been exposed to the unknown radiation source for the same period of time. Inasmuch as the rate of current increase through the meter will vary as the strength of the radiation field in which the instrument is located, the presence and intensity of any radiation field can be readily calculated. It is, of course, not essential that some predetermined exposure period be employed. For example, simple calibration curves can readily be prepared which will make possible quantitative determinations of the intensity of radioactivity from an unknown source regardless of the time of exposure of the device to that source.

It has been found that both the accuracy and the sensitivity of the instrument are greatest when it is operating in its upper range. That is, when the output current is above about 40 microamperes. As above explained, the output current will be reduced to 0 only when the full negative voltage of the battery 30 is applied to the plate 28. If it is desired to operate the instrument only in its upper range, the sliding contact 34 of the potentiometer 32 is set to a position such that less than the full voltage of the battery 30 is applied to the plate 28 when the switch SW1 is closed. The position of this sliding contact will determine the initial or starting current flow through the microammeter 26. If a highly accurate reading is desired, this sliding contact is positioned so that when the switch SW1 is momentarily closed, an initial current of about 40 microamperes will flow. Due to the presence of radioactivity, of cosmic rays and of leakage through the finite resistance between the plate 28 and the cathode 12 this current flow will gradually increase. The period of time which elapses before the current flow reaches say 60, microammeters can be compared to the elapsed time for a similar current increase when the instrument is exposed to either a standard, known radiation source or is placed in a field devoid of radioactivity, such comparison providing quick and accurate quantitative and qualitative measurement of radiation from an unknown source. Of course, the same data can be obtained if meter readings are compared to a known standard after a certain lapse of time rather than comparing the time required for a predetermined incremental current increase.

Figure 3:
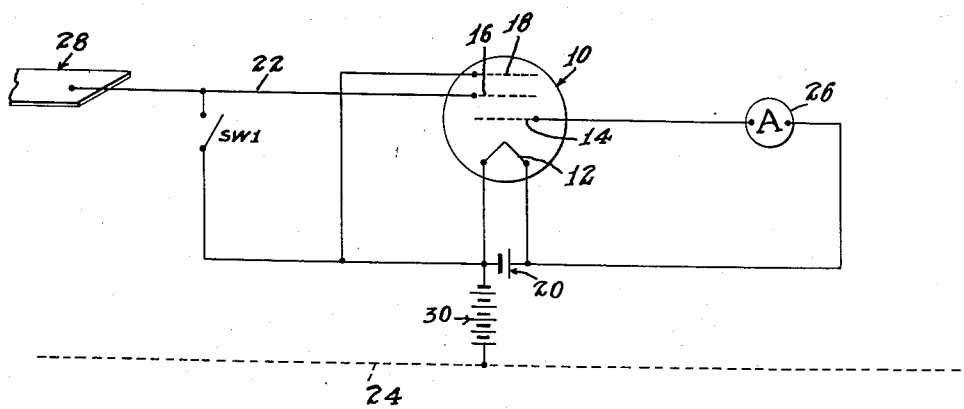
Figure 3 is a circuit diagram of a modification of the circuit shown in Figure 2.

Figure 3 illustrates a modification of the circuit shown in Fig. 2. In this modification, the battery 30 is connected, at its positive terminal to the cathode 12 and at its negative terminal to the case 24. The switch SW1 is connected directly between the collector plate 28 and the cathode 12. The circuit shown in Fig. 3 operates in just the reverse manner to that shown in Fig. 2. Thus, by momentarily closing the switch SW1, the potential of the collector plate 28 is made equal to that of the cathode 20. Due, however, to the battery 30 the collector plate will be at 30 volts positive with respect to the case 24. At the initial or starting point, that is, just after the switch SW1 has been momentarily closed, the output current of the tube 10 will be a maximum and the microammeter 26 will show a maximum reading. The collector plate 28, being positive with respect to the case 24, will attract negatively charged ions in the chamber. The collection of such ions on the plate 28 will cause the gradual building up of a negative charge on the plate 28 and consequently an increasing negative voltage on the grid 16. This negative voltage will reduce the flow of current through the tube and hence the reading on the meter 26. After sufficient time has elapsed, the collector plate 28 will approach the potential of the case 24 and will then be at a negative potential with respect to the cathode 20 an amount equal to the voltage of the battery 30. If the battery 30 is of sufficient voltage, current through the tube will be entirely cut off. Thus, it is seen that the operation of the device shown in Fig. 3 is just the reverse of that shown in Fig. 2. The initial current flow is a maximum and the rate of decrease of such current flow will represent the intensity of any radioactivity to which the device is exposed. If it be desired to operate the device only over its most accurate range, that is, above about 40 microampers, a variable voltage divider similar to 32 of Fig. 2 may be bridged across the battery 30 in a manner similar to that shown in Fig. 2, and the voltage divider set so as to give a reference point at 40 microamperes or higher. One advantage of the circuit of Fig. 3 is that the tube current decreases rather than increases with time, with the result that if the instrument be inadvertently left operating for a protracted period of time, a minimum rather than a maximum tube current will result.

The circuit shown in Fig. 4 is identical in all respects to that shown in Fig. 3 except that a variable resistance 33 is inserted between the cathode 12 and the collector plate 28. The presence of such resistance makes possible the standardization of an instrument regardless of its location and further makes possible the adjustment of several different instruments so that they will have uniform characteristics despite slight unavoidable differences in electrical characteristics. As previously discussed, a back count or positive indication will result from the presence of cosmic rays. In different locations the intensity of cosmic radiation will vary with the result that when the same instrument is used in different locations in which different cosmic ray intensities exist, the rate of change of current due to back count will vary. In addition, the total back count will vary from instrument to instrument since very slight variations in such things as tube sockets, insulators and the like will result in differences in the finite impedance between the collector plate 28 and the cathode 12. By means of a resistor such as R–32 in Fig. 4, the total back count can be made uniform as to all instruments used and regardless of changes in the intensity of cosmic radiation as the location of such instruments is changed. Thus, it is only necessary to adjust the resistor 32 so as to give a certain predetermined or standard back count for each instrument in each location. When this is done, the rate of current change observed on the instrument will correspond to a certain value of intensity of radiation (other than cosmic) regardless of the location of the instrument or of the particular instrument used. The presence of the resistor 32 in the circuit of Fig. 4 will cause an increased current flow from the collector plate 28 to the cathode 12 and thereby tend to maintain the potential of the collector plate equal to that of the cathode. This tendency will oppose the change in potential of the collector plate caused by the presence of radioactivity. Thus the resistor 32 will decrease the rate of change of current flow through the meter 26 when the instrument is exposed to a radioactive field. It is necessary, of course, that the resistance 32 be exceedingly high, otherwise the potential of the collector plate 28 relative to the cathode 12 will not vary with the result that the output current through the meter 26 will not be changed by the presence of radioactivity. While several high resistance materials can be used, it has been found that a simple glass rod is satisfactory for this resistor. The resistance of the rod can be made variable by means of a movable metal ring about the rod which is electrically connected to the cathode 12. Such a ring corresponds to the sliding contact 36 shown in Fig. 4.

While the variable resistor 32 has been shown only in the embodiment of the invention shown in Fig. 3, it may be included in any of the other embodiments of the invention described herein with identical results. If a resistor 32 is incorporated in the circuit shown in Fig. 3, its effect will be the same as that hereinabove described except that rather than oppose the change in output current flow caused by radioactivity, it will add to such change. Thus the resistor 32 will tend to reduce the potential difference between the collector plate 28 and the cathode 12 just as does the presence of radioactivity. It is therefore essential that the resistance of the resistor 32 be exceedingly high, otherwise the useful reading time will become so short that the instrument will be practically useless as an integrating device and assumes the characteristics of an intensity indicator.

An additional embodiment of the invention is shown in Fig. 5. The circuit there shown is particularly useful in the event that it is desired to take accelerated or short time readings. The circuit differs from those previously described in that double pole, double throw switch SW2 is employed in conjunction with battery 30 rather than the simple single pole switch SW1.

To operate a device incorporating the circuit shown in Fig. 5, the switch SW2 is first thrown momentarily to the left which places the collector plate 28 at minus 30 volts with respect to the cathode 12. The switch is then thrown to the right which is the normal operating position. This places the cathode 12 at 30 volts negative with respect to the case 24. As is apparent, the collector plate 28 will be initially at 60 volts negative with respect to the case 24. This potential difference between the collector plate and the case is double that existing in the device illustrated in Figs. 2 through 4 and consequently will accelerate the attraction of positive ions in the chamber, thereby accelerating the rate of tube current variation as indicated by the meter 26. If it is desired to control the operating range of the device shown in Fig. 5, a variable potentiometer such as 32 of Fig. 2 may be bridged across the battery 30. In this respect, the operation of the device will be identical to those heretofore described. Further, a variable resistor such as 32 of Fig. 4 may be employed in the circuit of Fig. 5 making possible the standardization of the characteristics of different instruments and of the back count due to cosmic radiation.

One important advantage of the device illustrated in Figs. 2 through 5 is that its operation is not impaired nor its accuracy affected if during a protracted reading the instrument is turned off, that is, the filament battery 20 is disconnected. Since the output current flow will be determined by the potential difference between the collector plate 28 and the cathode 12, and that potential difference does not depend upon the presence of current flow from the cathode 12, a reading may be taken, the filament battery disconnected and then, at some later time, the filament battery again connected and another reading taken. Such procedure will greatly prolong both filament battery and tube life.

It will be appreciated to those skilled in the art, that the exact spacing described above in connection with 1T4 type tube used as illustrated need not be preserved to realize advantageous features of the present invention. Thus the spacings between grids 14, 16 and 18 are not critical so long as voltages applied thereto are commensurate with their spacing and in accordance with the teachings enumerated above. In such case the anode 18, either in a grid or plate form, need not necessarily be connected directly to the cathode but a voltage source may be serially connected between the grid 18 and the cathode; however, the circuit as shown herein is preferred in certain instances where it is desirable to eliminate the necessity for providing an additional battery or voltage source between the anode 18 and cathode 12.

It is to be understood that the forms of the invention herewith shown and described are to be taken as preferred examples of the same and that various modifications may be resorted to without departing from the spirit of the invention or the scope of the appended claims.

Having thus described the invention, I claim:

1. In a direct current amplifier, a vacuum tube having a cathode, a first grid, a second grid and a third grid, said second grid being positioned in an electrically balanced position between said first and third grids, and said third grid being directly connected to said cathode, an output circuit connected between said cathode and said first grid and an input circuit between said second grid and said cathode.

2. In a direct current amplifier, a vacuum tube having a cathode, a first grid, a second grid and a third grid, said second grid being positioned in an electrically balanced position between said first and third grids, a battery connected in parallel with said cathode for heating the cathode, an output circuit connected between the positive terminal of the said battery and the said first grid, means connected to said second grid for applying a control voltage thereto and a connection between said third grid and the negative terminal of the said battery.

3. In a direct current amplifier, a vacuum tube having a cathode, a first grid, a second grid and a third grid, said second grid being positioned in an electrically balanced position between said first and third grids, a battery connected in parallel with said cathode for heating the cathode, an output circuit connected between the positive terminal of the said battery and the said first grid, said output circuit being of low direct current impedance, a connector to said second grid for applying a control voltage thereto, said connector being insulated from and at high impedance to the other circuit elements and a connector between said third grid and the negative terminal of the said battery.

4. In a direct current amplifier, a vacuum tube having a cathode, a first grid, a second grid and a third grid, said second grid being positioned in an electrically balanced position between said first and third grids, a battery connected in parallel with said cathode for heating the cathode, an output circuit connected between the positive terminal of the said battery and the said first grid, said output circuit being of low direct current impedance, a connection between the said third grid and the negative terminal of the said battery, means for applying an initial voltage to said second grid whereby the current flow through the said output circuit is initially controlled and additional means for varying the voltage on the said second grid.

5. In a direct current amplifier, a vacuum tube having a cathode, a first grid, a second grid and a third grid, said second grid being positioned in an electrically balanced position between said first and third grids, a battery connected in parallel with said cathode for heating the cathode, an output circuit connected between the positive terminal of the said battery and the said first grid, a connector to said second grid for applying a control voltage thereto, said connector being insulated from the said cathode, a second battery, the positive terminal of which is connected to the said cathode and the negative terminal of which is connected through a circuit including a switch to the said connector, and a connection between the said third grid and the negative terminal of the first mentioned battery.

6. In a direct current amplifier, a vacuum tube having a cathode, a first grid, a second grid and a third grid, said second grid being spaced between said first and third grids, a battery connected in parallel with said cathode for heating the cathode, an output circuit connected between the positive terminal of the said battery and the said first grid, said output circuit being of low direct current impedance, a connection between the said third grid and the negative terminal of the said battery, a second battery connected at one terminal to the cathode, a circuit connecting the other terminal of the said second battery to the said connector including a switch, and a variable potentiometer bridging said battery whereby a portion of the voltage across said second battery may be applied between the said cathode and the said second grid.

7. An amplifier as set forth in claim 6 and wherein a variable resistor is connected between the said second grid and cathode.

8. In a device for detecting and measuring radioactivity wherein a collector plate is disposed within an air-tight case; the combination with said collector plate of an amplifier including a vacuum tube having a cathode, a first grid, a second grid and a third grid, said second grid being positioned in an electrically balanced position between said first and third grids, an indicator connected between said cathode and said first grid, a connection between said collector plate and said second grid and an additional connection between said cathode and said third grid.

9. A device in accordance with claim 8 and in which a variable resistor is connected between the said second grid and cathode.

10. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a current indicator connected between said cathode and said first grid, a connection between said collector plate and said second grid, an additional connection between said cathode and said third grid, a battery connected at one terminal thereof to the said case and means for intermittently interconnecting the other terminal of the said battery to the said collector plate.

11. A device in accordance with claim 10 and in which a variable resistor is connected between the said second grid and cathode.

12. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a current indicator connected between said cathode and said first grid, a connection between said collector plate and said second grid, an additional connection between said cathode and said third grid, a battery and means for intermittently applying a portion of the voltage across the said battery between the said case and collector plate.

13. A device in accordance with claim 12 and wherein said means includes a variable potentiometer and a switch connected thereto.

14. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a battery connected in parallel with said cathode for heating the cathode, a current indicator connected between the positive terminal of the said battery and the first grid, a connection between said collector plate and said second grid, an additional connection between the negative terminal of the said battery and the third grid, a second battery connected at one terminal thereof to the said case and means for intermittently connecting the other terminal of the said second battery to the collector plate.

15. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a battery connected in parallel with said cathode for heating the cathode, a current indicator connected between the positive terminal of the said battery and the first grid, a connection between said collector plate and said second grid, an additional connection between the negative terminal of the said battery and the third grid, a second battery and a switch for intermittently applying a portion of the voltage across the said second battery between the said case and collector plate.

16. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a battery connected in parallel with said cathode for heating the cathode, a current indicator connected between the positive terminal of the said battery and the first grid, a connection between said collector plate and said second grid, an additional connection between the negative terminal of the said battery and the third grid, a second battery, a potentiometer bridging the said second battery and means including a switch for intermittently applying the voltage across the said potentiometer between the case and the collector plate.

17. A device in accordance with claim 16 and wherein a variable resistor is connected between the said second grid and the negative terminal of the first mentioned battery.

18. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a battery connected in parallel with said cathode for heating the cathode, a current indicator connected between the positive terminal of the said battery and the first grid, a connection between said collector plate and said second grid, an additional connection between the negative terminal of the said battery and the third grid, a second battery, means for applying the voltage across the said second battery between the collector plate and the negative terminal of the first mentioned battery and additional means for applying the voltage across the said second battery between the case and the negative terminal of the first mentioned battery in such polarity that the voltage between the case and the collector plate will be double that across the said second battery.

19. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a battery connected in parallel with said cathode for heating the cathode, a current indicator connected between the positive terminal of the said battery and the first grid, a connection between said collector plate and said second grid, an additional connection between the negative terminal of the said battery and the third grid, a second battery, a double pole, double throw switch for applying the voltage across the said second battery between the collector plate and the negative terminal of the first mentioned battery and for then applying said battery voltage between the case and the negative terminal of the first mentioned battery in such polarity that the voltage between the case and the collector plate will be double that of the said second battery voltage.

20. A device in accordance with claim 19 wherein a variable resistor is connected between the said second grid and the negative terminal of the first mentioned battery.

21. In a device for detecting and measuring radioactivity wherein a collector plate is disposed within an air-tight case; the combination with said collector plate of an amplifier including a vacuum tube having a cathode, a first grid, a second grid and a third grid, said second grid being spaced between said first and third grids, a battery connected in parallel with said cathode for heating the cathode, a current indicator connected between the positive terminal of the said battery and the first grid, a connection between said collector plate and said second grid, an additional connection between the negative terminal of the said battery and the third grid, a second battery, a variable potentiometer connected across the second battery, means for applying the voltage across the potentiometer between the collector plate and the negative terminal of the first mentioned battery and means for applying the voltage across the potentiometer between the case and the negative terminal of the first mentioned battery in such polarity that the voltage between the case and the collector plate will be double that across the potentiometer.

22. A device in accordance with claim 21 wherein a variable resistor is connected between the said second grid and the negative terminal of the first mentioned battery.

LESLIE LYNCH.

References Cited in the file of this patent

UNITED STATES PATENTS

| Number | Name | Date |
| --- | --- | --- |
| 1,611,716 | Brown | Dec. 21, 1926 |
| 1,938,136 | Crew | Dec. 5, 1933 |
| 2,267,820 | Droz | Dec. 30, 1941 |
| 2,496,886 | Molloy | Feb. 7, 1950 |
| 2,503,730 | Hare | Apr. 11, 1950 |
| 2,534,928 | Schneeberger | Dec. 19, 1950 |